(12) United States Patent
Suzuki et al.

(10) Patent No.: US 9,557,602 B2
(45) Date of Patent: Jan. 31, 2017

(54) DISPLAY DEVICE WITH OPTICAL MEMBER AND SUPPORT MEMBER

(71) Applicant: Funai Electric Co., Ltd., Osaka (JP)

(72) Inventors: Tomokazu Suzuki, Osaka (JP); Makoto Nameda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 106 days.

(21) Appl. No.: 14/449,718

(22) Filed: Aug. 1, 2014

(65) Prior Publication Data
US 2015/0049508 A1 Feb. 19, 2015

(30) Foreign Application Priority Data

Aug. 19, 2013 (JP) .................................. 2013-169547

(51) Int. Cl.
*G02F 1/1335* (2006.01)
(52) U.S. Cl.
CPC ... *G02F 1/133611* (2013.01); *G02F 1/133608* (2013.01); *G02F 1/133603* (2013.01)
(58) Field of Classification Search
CPC .............. G02F 1/133608; G02F 1/133606; G02F 1/133611; G02F 1/133603
See application file for complete search history.

(56) References Cited

U.S. PATENT DOCUMENTS

| 7,760,291 B2 * | 7/2010 | Morita ............. G02F 1/133611 349/69 |
| 9,128,326 B2 * | 9/2015 | Cho .................. G02F 1/133608 |
| 2007/0103889 A1 | 5/2007 | Hsu et al. |
| 2013/0194529 A1 * | 8/2013 | Chang ............... G02F 1/133608 349/58 |
| 2014/0211123 A1 * | 7/2014 | Lee .................. G02F 1/133608 349/64 |

FOREIGN PATENT DOCUMENTS

| EP | 1621921 A1 | 2/2006 |
| JP | 2010009950 A | 1/2010 |
| KR | 101326299 B1 * | 11/2013 ....... G02F 1/133606 |

OTHER PUBLICATIONS

Extended European Search Report issued in corresponding European Application No. 14179787.8, mailed Jan. 28, 2015 (8 pages).

* cited by examiner

*Primary Examiner* — Robert May
(74) *Attorney, Agent, or Firm* — Osha Liang LLP

(57) ABSTRACT

A display device includes a display unit, a light source disposed on a back surface side of the display unit and that irradiates light to the display unit, an optical member disposed between the display unit and the light source, and a support member disposed so that the light irradiated from the light source is incident to a side surface of the support member and so that the light incident to the side surface is transmitted through the support member. The support member supports the optical member from a back surface side of the optical member, and the support member includes an entrance portion comprising an inclined surface that refracts the light incident to the side surface and a light guide portion that guides the light refracted at the inclined surface to an optical member side of the support member.

20 Claims, 19 Drawing Sheets

DISPLAY DEVICE WITH OPTICAL MEMBER AND SUPPORT MEMBER

TECHNICAL FIELD

This invention relates generally to a display device and more particularly to a display device provided with a support member that supports an optical member.

BACKGROUND TECHNOLOGY

Conventional display devices are provided with a support member that supports an optical member (for example, see Patent Document 1).

Disclosed in the above Patent Document 1 is an electro-optical device (display device) having an optical plate (optical member) disposed at predetermined intervals above a plurality of light sources and a plurality of protrusions (support members) disposed respectively between mutually adjacent light sources. In this electro-optical device, the protrusion is configured from a light-transmissive material having a prismatic shape and is disposed so as to support by an upper surface abutting the optical plate.

RELATED ART DOCUMENTS

Patent Documents

[Patent Document 1] Japanese Unexamined Patent Application Publication No. 2010-9950

However, in the electro-optical device disclosed in the above Patent Document 1, there is a defect where a shadow is more likely to form due to an amount of light that arrives near a portion where the protrusion supports the optical plate decreasing because a light that ingresses to the protrusion from the light source is refracted at a side surface of the protrusion having a prismatic shape or is reflected at an upper surface of the protrusion that supports the optical plate. As a result, unevenness in an amount of light occurs in a display unit that displays a video or the like by a light transmitted through the optical plate.

SUMMARY OF INVENTION

One or more embodiments of the invention provide a display device that can suppress unevenness in an amount of light from occurring in a display unit by an amount of light arriving near a portion where a support member supports an optical member being decreased.

According to one or more embodiments of the invention, a display device may comprise: a display unit; a light source disposed on a back surface side of the display unit and that irradiates light to the display unit; an optical member disposed between the display unit and the light source; and a support member disposed so that the light irradiated from the light source is incident to a side surface of the support member and so that the light incident to the side surface is transmitted through (i.e., transmitted to an interior of) the support member, wherein the support member may support the optical member from a back surface side of the optical member, and the support member may comprise: an entrance portion comprising an inclined surface that refracts the light incident to the side surface; and a light guide portion that guides the light refracted at the inclined surface to an optical member side of the support member.

According to one or more embodiments of the invention, as described above, the support member, by including the inclined surface that refracts the light incident to the side surface and the light guide portion that guides the light refracted at the inclined surface to the optical member side of the support member, can guide a light that enters an entrance portion of the support member to the optical member side of the support member by the light guide portion. By this, an amount of light that arrives near a portion of the support member that supports the optical member can be suppressed from decreasing. As a result, unevenness in an amount of light in the display unit that displays by a light transmitted through the optical member can be suppressed from occurring.

According to one or more embodiments of the invention, the side surface of the support member may comprise: a front side surface to which the light irradiated from the light source is incident; and a rear side surface on a side opposite the front side surface, and the inclined surface of the entrance portion may be disposed on the rear side surface of the support member at an incline so as to reflect the light that enters the entrance portion to a light guide portion side. According to one or more embodiments, by configuring in this manner, because the inclined surface is inclined so as to reflect the light that enters the entrance portion to the light guide portion side, the light incident to an inside of the support member via the front side surface can be reflected to the light guide portion side by the inclined surface and easily guided to the light guide portion.

According to one or more embodiments of the invention, the support member may comprise a contact portion that contacts the optical member, and the light guide portion may guide the light that enters from the entrance portion to exit to a region on the optical member where a shadow occurs due to light transmitted through the contact portion being refracted. According to one or more embodiments, by configuring in this manner, because the light guided by the light guide portion is made to exit to the region on the support member where the shadow occurs, light amount unevenness can be effectively suppressed from occurring on the optical member.

According to one or more embodiments of the invention, the entrance portion may be disposed so that a position of the entrance portion in a direction parallel to the optical member overlaps the contact portion when viewed from a side surface side of the support member to which light is incident, and a width of the entrance portion is equal to or greater than a width of the contact portion. According to one or more embodiments, by configuring in this manner, more of a light incident to the support member can be made to enter a wide entrance portion and more of the light that enters the entrance portion can be guided to the contact portion by the light guide portion.

According to one or more embodiments of the invention, the support member may comprise an exit portion where the light guided by the light guide portion exits the support member, and the exit portion may be disposed near the contact portion of the support member and may comprise a surface substantially orthogonal to a top surface of the optical member and a surface substantially parallel to the optical member. According to one or more embodiments, by configuring in this manner, an exit direction of the guided light can be adjusted by adjusting sizes of the surface substantially orthogonal to the top surface of the optical member and the surface substantially parallel to the optical member. By this, for example, because exiting can be performed more precisely to the region on the optical member where the shadow occurs, the light amount unevenness can be further suppressed from occurring on the optical member.

According to one or more embodiments of the invention, the entrance portion may be disposed on the support member below a straight line connecting the light source and an outer edge portion of the optical member. According to one or more embodiments, by configuring in this manner, because the optical member and the straight line connecting the light source and the entrance portion do not intersect, a shadow of the entrance portion can be suppressed from occurring on the optical member. As a result, for example, the light amount unevenness can further be effectively suppressed from occurring on the optical member.

According to one or more embodiments of the invention, the light source may comprise a first light source and a second light source disposed respectively in a front side surface direction of the support member in which the light irradiated from the light source is incident and a rear side surface direction on the side opposite the front side surface, and the entrance portion may be disposed on the support member below a straight line connecting the first light source and an intersection of the optical member and a perpendicular line extending from the second light source on an optical member side. According to one or more embodiments, by configuring in this manner, while a shadow due to the entrance portion occurs on the top surface of the optical member, an influence of this shadow can be mitigated by a light from the second light source. As a result, for example, the light amount unevenness can further be effectively suppressed from occurring on the optical member.

According to one or more embodiments of the invention, the support member may be formed in a tabular shape and may comprise a front side surface to which the light irradiated from the light source is incident and a rear side surface on the side opposite the front side surface and comprising the inclined surface of the entrance portion, and the front side surface and the rear side surface of the support member may be formed to be substantially parallel to each other. According to one or more embodiments, by configuring in this manner, the light that enters the support member can be guided in an optical member direction by being reflected back and forth at a substantially constant reflection angle between the front side surface and the rear side surface. As a result, for example, guiding can be performed easily to the optical member side in the support member.

According to one or more embodiments of the invention, the entrance portion may comprise reflective material that can reflect the light irradiated from the light source. According to one or more embodiments, by configuring in this manner, the light irradiated from the light source that enters the entrance portion can be easily reflected to the light guide portion.

According to one or more embodiments of the invention, the light source may comprise a point light source. According to one or more embodiments, by configuring in this manner, unlike when a line light source or the like is included, the light source can be made smaller in size.

According to one or more embodiments of the invention as described above, the display device that can suppress the unevenness in the amount of light from occurring in the display unit due to the amount of light arriving near the portion where the support member supports the optical member decreasing can be provided.

DETAILED DESCRIPTION OF EMBODIMENTS

Embodiments of the present invention will be described below based on the drawings.

First, a configuration of a liquid crystal television device 100 according to one or more embodiments of a first example of the present invention will be described with reference to FIGS. 1 to 12. The liquid crystal television device 100 is an example of a "display device" of the present invention.

Figure 1:
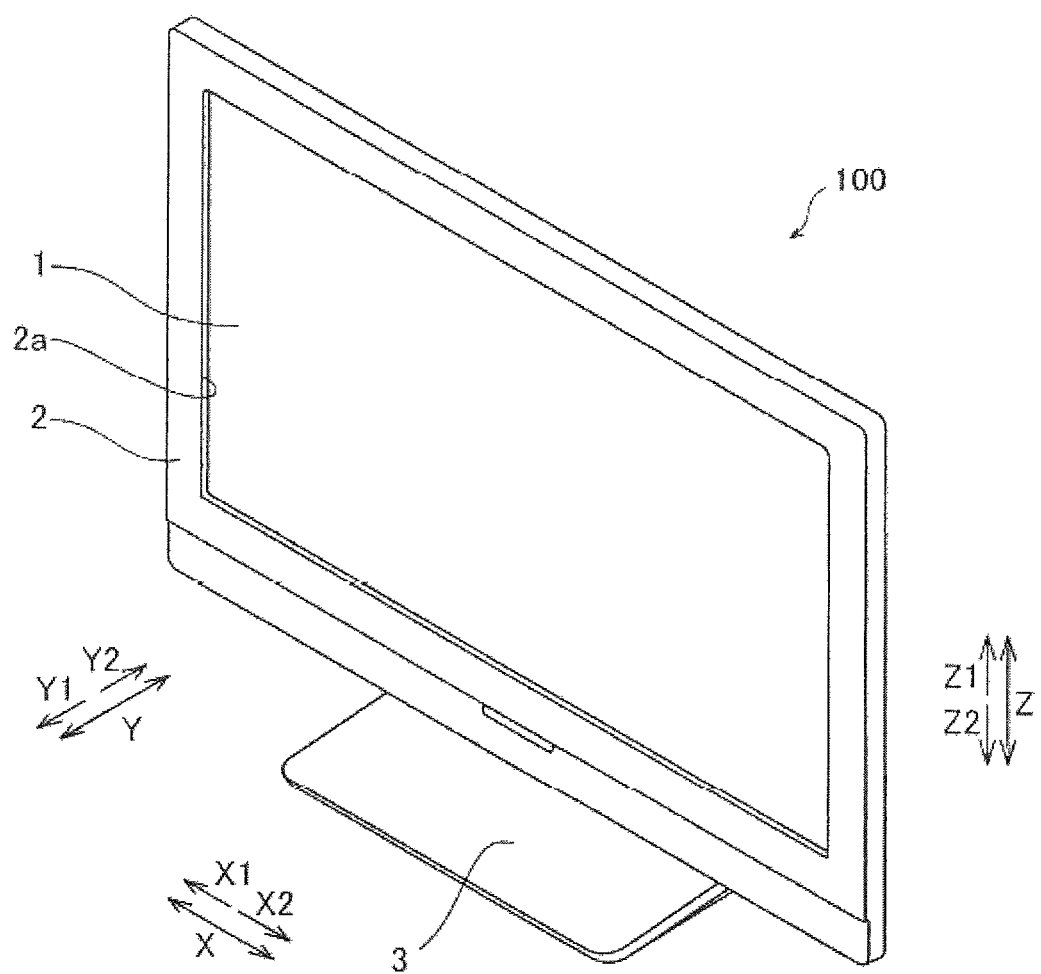
FIG. 1 is a perspective view illustrating an overall configuration of a liquid crystal television device according to one or more embodiments of a first example of the present invention.
Figure 2:
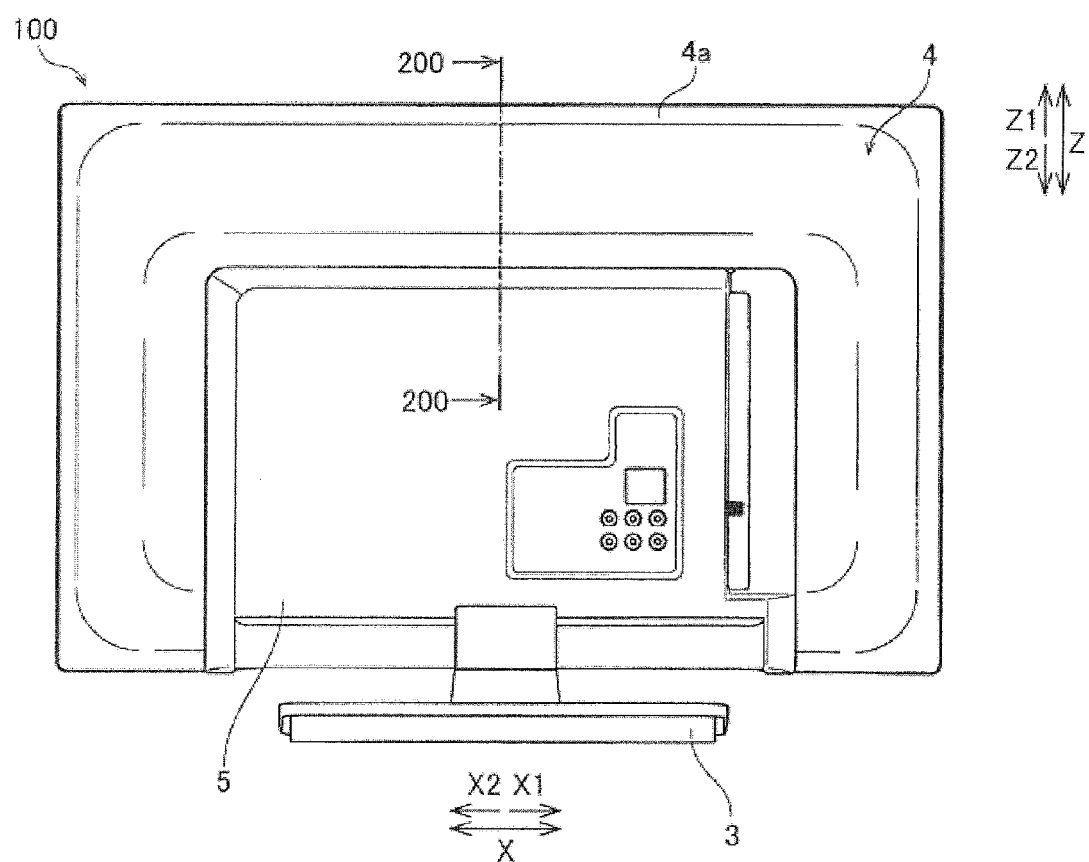
FIG. 2 is a rear view of the liquid crystal television device illustrated in FIG. 1.

According to one or more embodiments as illustrated in FIGS. 1 and 2, the liquid crystal television device 100 is provided with a display unit 1 configured from a liquid crystal cell that displays a video, a front portion enclosure 2 made of resin that supports the display unit 1 from a front surface side (arrow Y1 direction side), and a stand member 3 made of resin that supports the liquid crystal television device 100 from below (arrow Z2 direction side). The front portion enclosure 2 is formed in a frame shape having an outer shape of a rectangular shape when viewed from a front surface (when viewed from the arrow Y1 direction side). An opening portion 2a of a rectangular shape for exposing the display unit 1 to the front surface side is provided near a central portion of the front portion enclosure 2. Moreover, according to one or more embodiments as illustrated in FIG. 3, the front portion enclosure 2 is formed in a concave shape that sinks forward (arrow Y1 direction).

Figure 3:
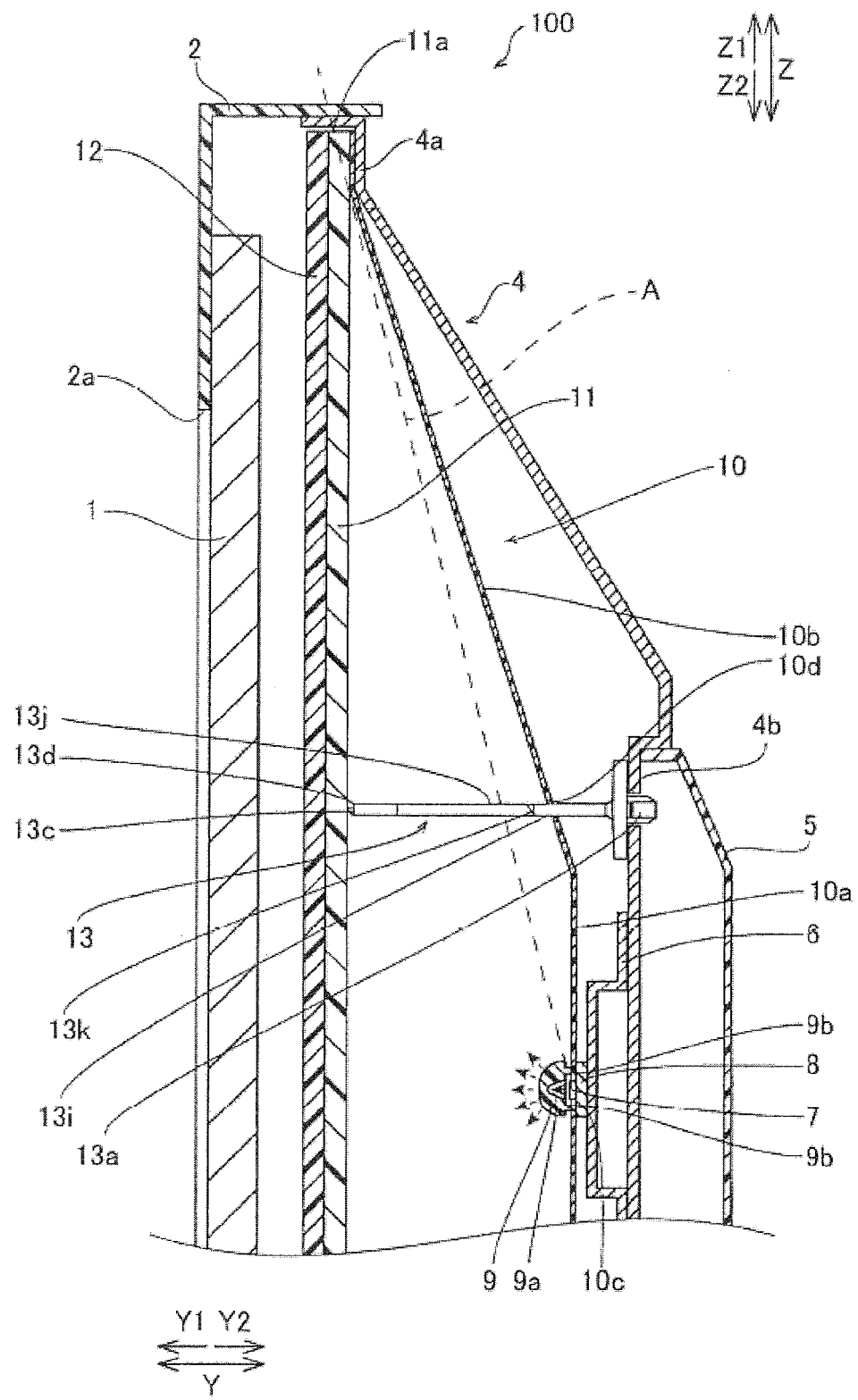
FIG. 3 is a schematic cross-sectional view along the line 200-200 in FIG. 2.

Furthermore, according to one or more embodiments as illustrated in FIG. 3, the liquid crystal television device 100 is provided with a rear frame 4 made of sheet metal combined with the front portion enclosure 2 from a back surface side (arrow Y2 direction side). Moreover, this rear frame 4 has an edge portion 4a of a rectangular shape that fits into a back surface side of the front enclosure 2. Moreover, the rear frame 4 is formed in a concave shape that sinks backward (arrow Y2 direction). The rear frame 4 is fixed to the front portion enclosure 2 by a screw member (not illustrated). Moreover, a cover member 5 made of resin that has a rectangular shape smaller than the rear frame 4 is disposed on a back surface side of the rear frame 4. The cover member 5 is provided so as to cover various substrates (not illustrated), such as a power source substrate and a signal processing substrate, disposed on a back surface of the rear frame 4. Moreover, the cover member 5 is fixed to the rear frame 4 by a screw member (not illustrated). A rear portion enclosure corresponding to the front portion enclosure 2 is configured by this rear frame 4 and this cover member 5.

Figure 4:
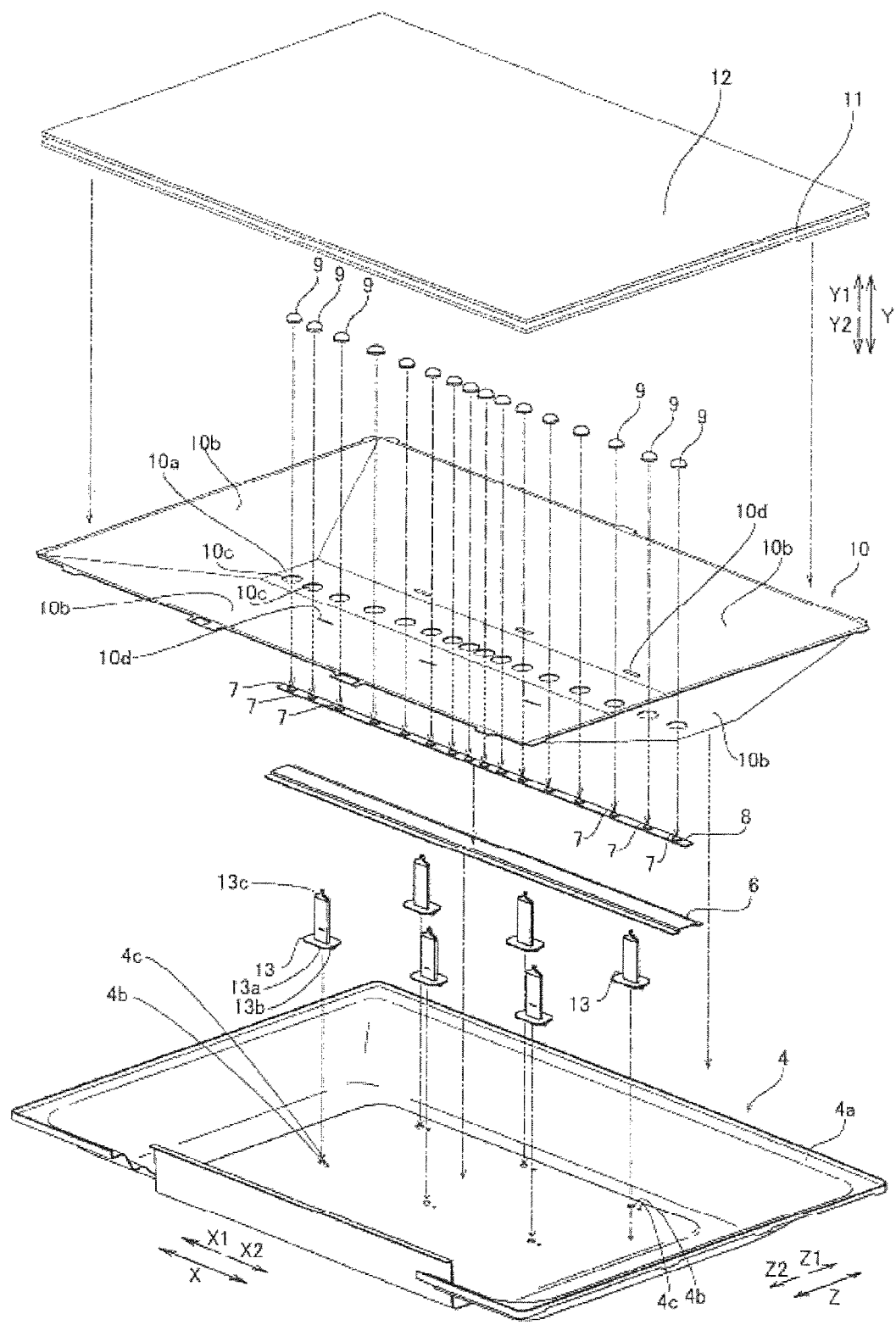
FIG. 4 is an exploded perspective view of the liquid crystal television device according to one or more embodiments of the first example of the present invention.

According to one or more embodiments as illustrated in FIG. 4, a heat sink 6 made of sheet metal is disposed on a top surface (surface on the arrow Y1 direction side) of the rear frame 4. Moreover, a substrate 8 mounted with a light source 7 that irradiates a light from the back surface side (arrow Y2 direction side) to the display unit 1 is disposed on the top surface of the heat sink 6. Moreover, a plurality of panel post fixing openings 4b and 4c into which a fixing portion 13a and a fixing portion 13b of a panel post 13 that will be described below are fitted is provided on the top surface (surface on the arrow Y1 direction side) of the rear frame 4.

Here, in one or more embodiments of the first example, the light source 7 is configured by, for example, a white light-emitting diode (LED). Moreover, according to one or more embodiments as illustrated in FIG. 4, a plurality of the light sources 7 is mounted on a top surface of the substrate 8 at intervals along a direction in which the substrate 8 extends (X direction). The white LED is an example of a "point light source" of the present invention.

Furthermore, according to one or more embodiments as illustrated in FIG. 3, a diffuser lens 9 that covers each of the light sources 7 is installed on the top surface (surface on the arrow Y1 direction side) of the substrate 8 on which the light sources 7 are mounted. This diffuser lens 9 is configured by a resin such as acrylic and has a function of diffusing an emission light irradiated from the light source 7 to a display unit 1 side (see the dotted lines with arrows in FIG. 3). A concave portion 9a is provided near a central portion (position on the top surface of the substrate 8 corresponding to the light source 7) of a bottom surface of the diffuser lens 9. Moreover, a boss 9b of a columnar shape extending from the bottom surface of the diffuser lens 9 to a substrate 8 side is provided on the diffuser lens 9. The diffuser lens 9 is installed in the position on the top surface of the substrate 8 corresponding to the light source 7 by this boss 9b being adhered to the top surface of the substrate 8.

According to one or more embodiments as illustrated in FIG. 4, a reflective sheet 10 made of resin that reflects the light irradiated from the light source 7 to the display unit 1 side is disposed between the substrate 8 and the diffuser lens 9. This reflective sheet 10 has a shape conforming to the rear frame 4 (concave shape that sinks to the arrow Y2 direction side) when disposed on the top surface of the substrate 8. The reflective sheet 10 includes a reflective sheet bottom surface portion 10a having a rectangular shape extending in a lateral direction (X-axis direction) and four reflective sheet inclined surface portions 10b disposed so as to surround four sides of the reflective sheet bottom surface portion 10a. According to one or more embodiments as illustrated in FIG. 3, the reflective sheet bottom surface portion 10a is formed so as to extend parallel to a diffuser panel 11 that will be described below. Moreover, the reflective sheet inclined portion 10b is formed so as to extend at an incline from an end portion of the reflective sheet bottom surface portion 10a to the edge portion 4a of the rear frame 4.

Figure 5:
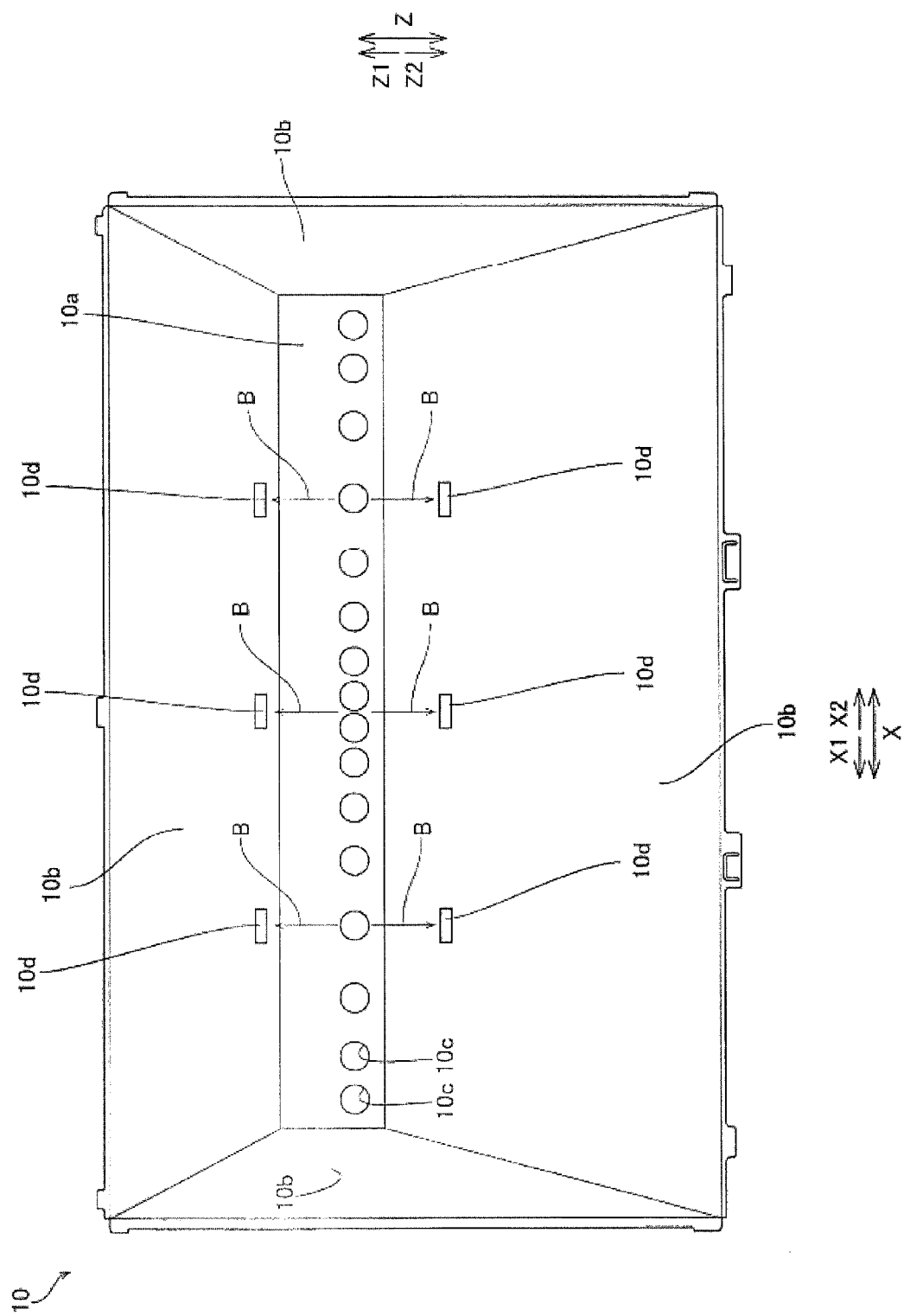
FIG. 5 is a plan view of a reflective sheet according to one or more embodiments of the first example of the present invention.

Furthermore, according to one or more embodiments as illustrated in FIG. 5, a plurality of light source opening portions 10c corresponding respectively to the plurality of light sources 7 (diffuser lenses 9) is provided at intervals on one straight line in the lateral direction (X-axis direction) on the reflective sheet bottom surface portion 10a. Moreover, a panel post opening 10d for the panel post 13, which is fixed to the rear frame 4 and will be described below, to support the diffuser panel 11 by penetrating the reflective sheet 10 is provided on the reflective sheet inclined portion 10b. The panel post opening portion 10d is provided so the panel post 13 is disposed in a position opposing the light source 7 (see the arrow B in FIG. 5).

Here, in one or more embodiments of the first example, according to one or more embodiments as illustrated in FIG. 4, the liquid crystal television device 100 is provided with the diffuser panel 11 and an optical sheet 12, which are disposed between the display unit 1 and the light source 7. Specifically, a diffuser panel 11 made of resin that further diffuses a light diffused by the diffuser lens 9 to the display unit 1 side is disposed between the reflective sheet 10 and the display unit 1. Moreover, the diffuser panel 11 is formed in a tabular shape extending in a Z-axis direction and the X-axis direction. The optical sheet 12 that aligns a polarization direction of and emits to the display unit 1 a light transmitted through the diffuser panel 11 is disposed between the diffuser panel 11 and the display unit 1. The optical sheet 12 is formed to extend in the Z-axis direction and the X-axis direction and is formed in a tabular shape similar to the diffuser panel 11. The diffuser panel 11 and the optical sheet 12 are an example of an "optical member" of the present invention and that the panel post 13 is an example of a "support member" of the present invention.

Figure 6:
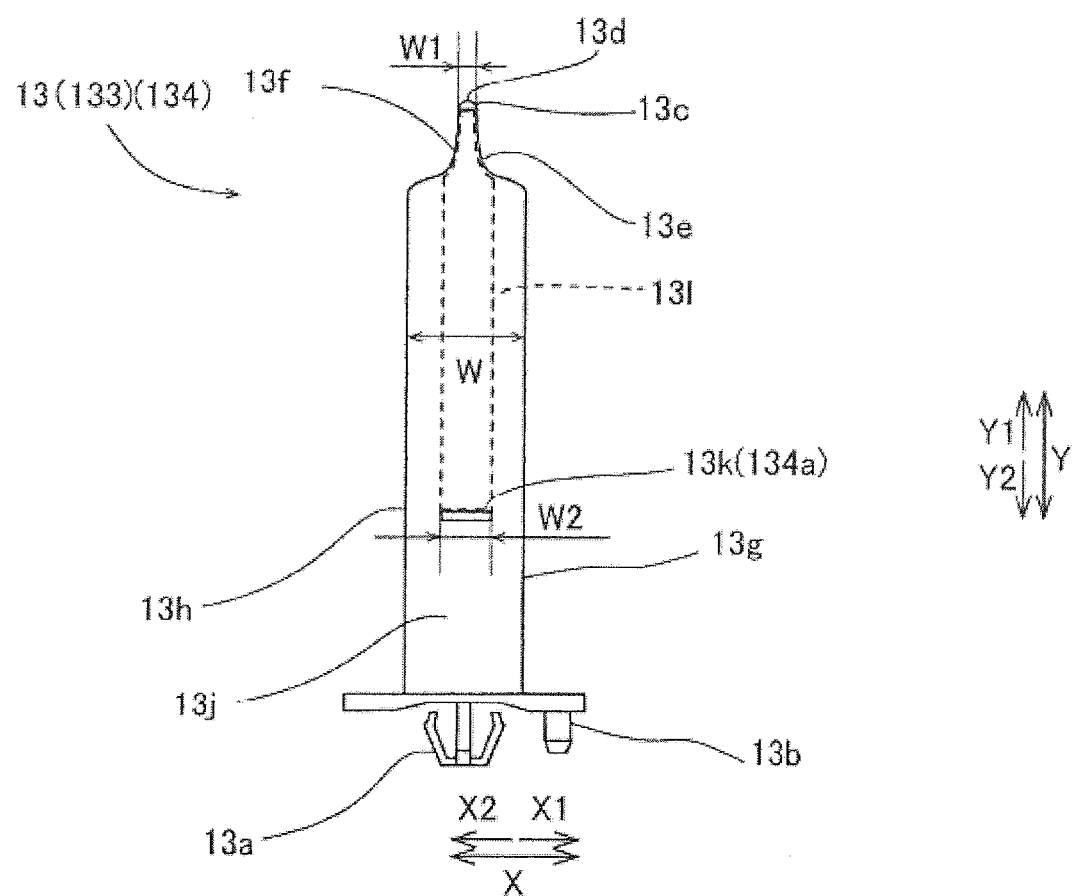
FIG. 6 is a front view of a panel post according to one or more embodiments of the first example of the present invention.
Figure 7:
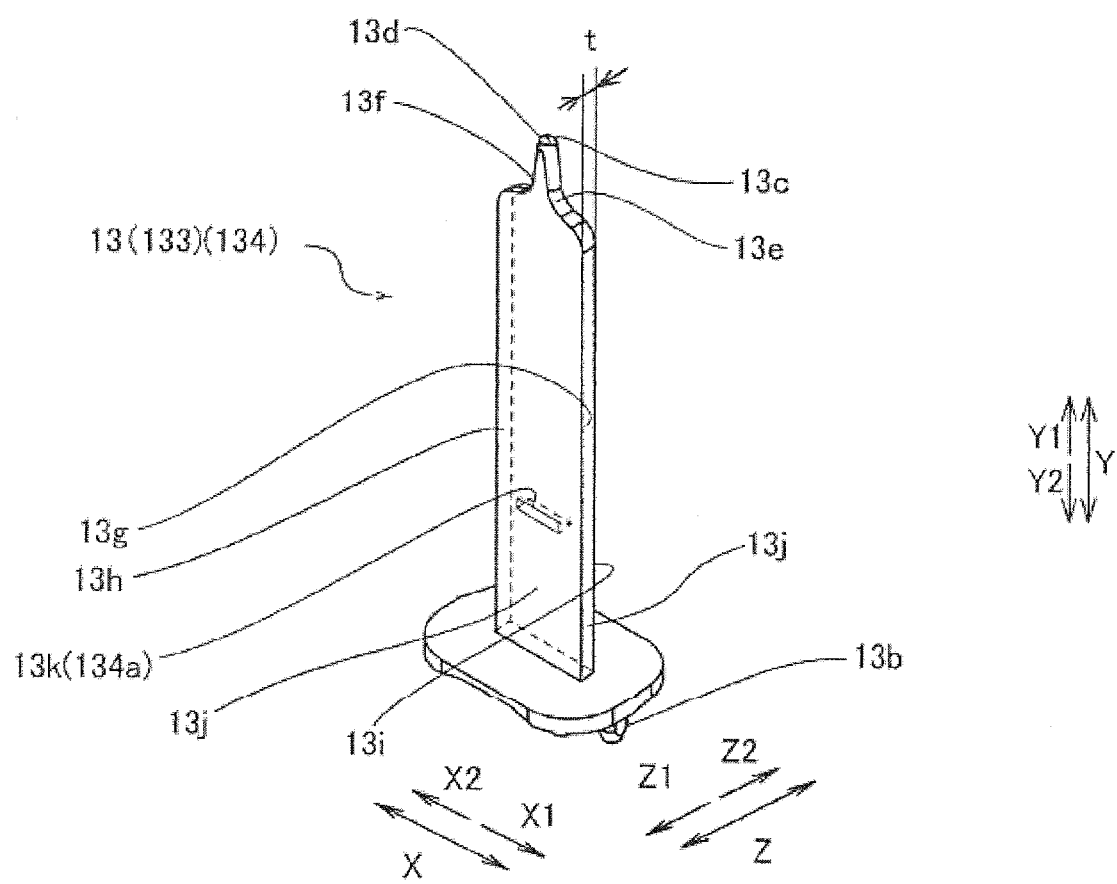
FIG. 7 is a perspective view of the panel post according to one or more embodiments of the first example of the present invention.

According to one or more embodiments as illustrated in FIGS. 6 to 7, in one or more embodiments of the first example, the liquid crystal television device 100 is configured to be able to transmit light and is provided with the panel post 13, which will be described below, that supports the diffuser panel 11 from a back surface side of the diffuser panel 11. The panel post 13 is configured from polycarbonate (PC), a material that can transmit light. Moreover, the panel post 13 is formed in a tabular shape having a width W and a thickness t. The panel post 13 is an example of the "support member" of the present invention.

Furthermore, according to one or more embodiments as illustrated in FIGS. 6 to 7, in one or more embodiments of the first example, a front side surface portion 13$i$ that makes the light irradiated from the light source 7 be incident to the panel post 13, a rear side surface portion 13$j$ provided on a side opposite the front side surface portion 13$i$, an entrance portion 13$k$ provided on the rear side surface portion 13$j$, a light guide portion 13$l$ that guides light that enters at the entrance portion 13$k$, and an exit portion 13$d$ that makes light guided by the light guide portion 13$l$ exit are provided in the panel post 13. Moreover, the panel post 13 includes a contact portion 13$c$ that contacts the diffuser panel 11, top sides 13$e$ and 13$f$ extending from the contact portion 13$c$ to outer sides, and a lateral side 13$g$ and a lateral side 13$h$ extending from the upper sides 13$e$ and 13$f$ to a side opposite the diffuser panel 11. Moreover, the panel post 13 includes the fixing portions 13$a$ and 13$b$ for fixing the panel post 13 to the rear frame 4. The front side surface portion 13$i$ is an example of a "side surface" and a "front side surface" of the present invention and that the rear side surface portion 13$j$ is an example of the "side surface" and a "rear side surface" of the present invention.

According to one or more embodiments as illustrated in FIGS. 6 and 7, in one or more embodiments of the first example, the front side surface portion 13$i$ and the rear side surface portion 13$j$ of the panel post 13 are formed so as to be substantially parallel to each other. Moreover, the contact portion 13$c$ is configured to make point contact with and support the diffuser panel 11 with a tip and has a width W1. Moreover, the contact portion 13$c$ has a spherical shape.

Figure 8:
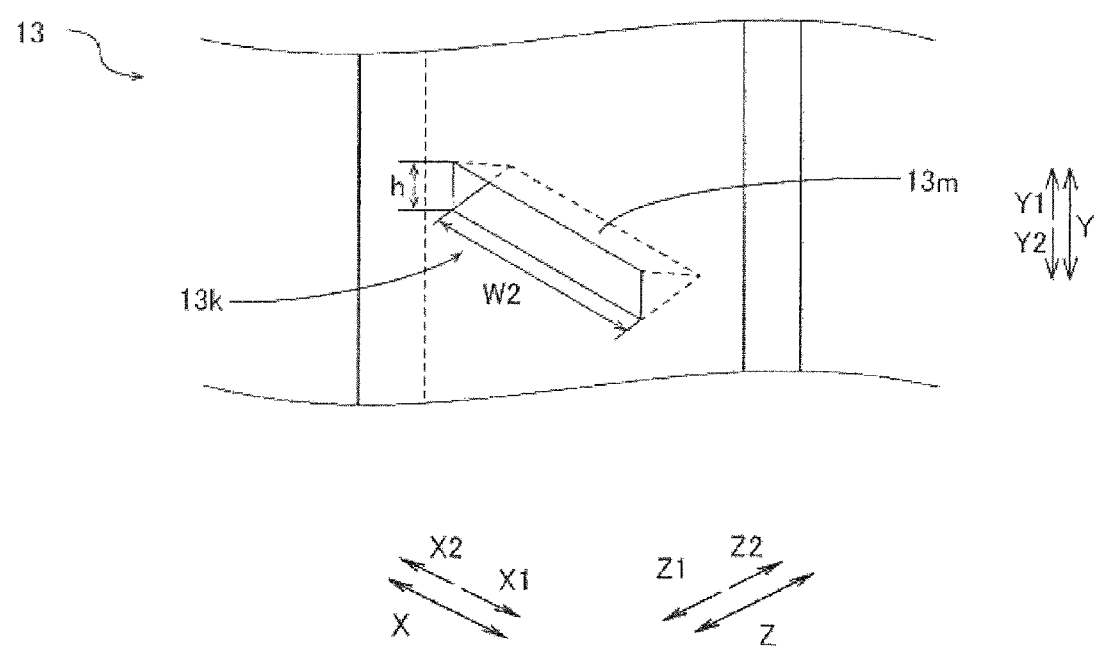
FIG. 8 is an enlarged view of an entrance portion of the panel post in FIG. 7.

According to one or more embodiments as illustrated in FIGS. 7 and 8, in one or more embodiments of the first example, the entrance portion 13$k$ has an inclined surface 13$m$ inclined relative to the front side surface portion 13$i$ and provided in a position corresponding to the front side surface 13$i$ of the entrance portion 13$k$. Moreover, this inclined surface 13$m$ is provided on the rear side surface portion 13$j$ of the panel post 13. Specifically, according to one or more embodiments as illustrated in FIG. 8, an opening of a rectangular shape of the width W and a height h is provided on the rear side surface portion 13$j$ of the panel post 13, and the inclined surface 13$m$ is formed on an upper side of the opening of the rectangular shape so as to be inclined relative to the front side surface portion 13$i$.

According to one or more embodiments as illustrated in FIG. 3, in one or more embodiments of the first example, the entrance portion 13$k$ is provided in a portion of the panel post 13 below a straight line A connecting the light source 7, which makes the light enter the entrance portion 13$k$, and an outer edge portion 11$a$ of the diffuser panel 11. Moreover, according to one or more embodiments as illustrated in FIG. 6, the entrance portion 13$k$ is provided so a position in a direction parallel to the diffuser panel 11 overlaps the contact portion 13$c$ when viewed from a front side surface portion 13$i$ side, to which the light is incident, of the panel post 13, and a width W2 of the entrance portion 13$k$ is formed to be equal to or greater than the width W1 of a contact portion. That is, a relationship between W1 and W2 is W2≥W1.

Figure 11:
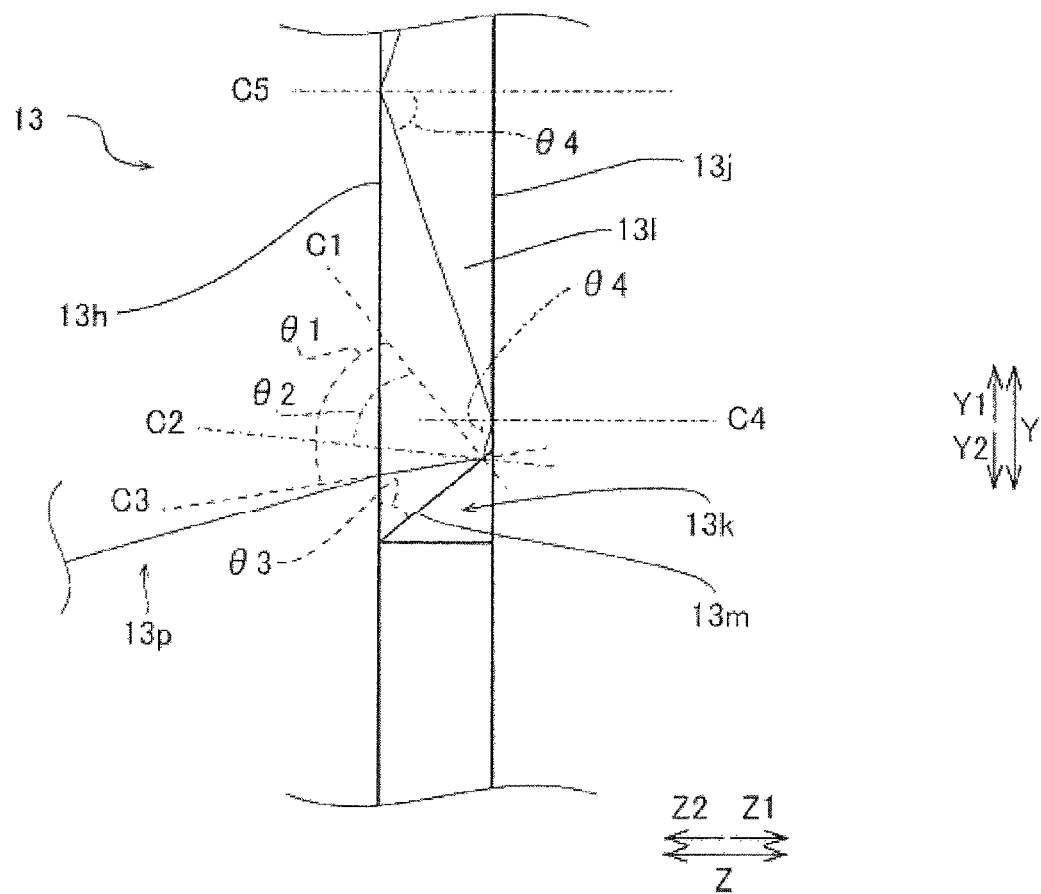
FIG. 11 is a diagram for describing an inclination angle of an inclined surface according to one or more embodiments of the first example of the present invention.
Figure 12:
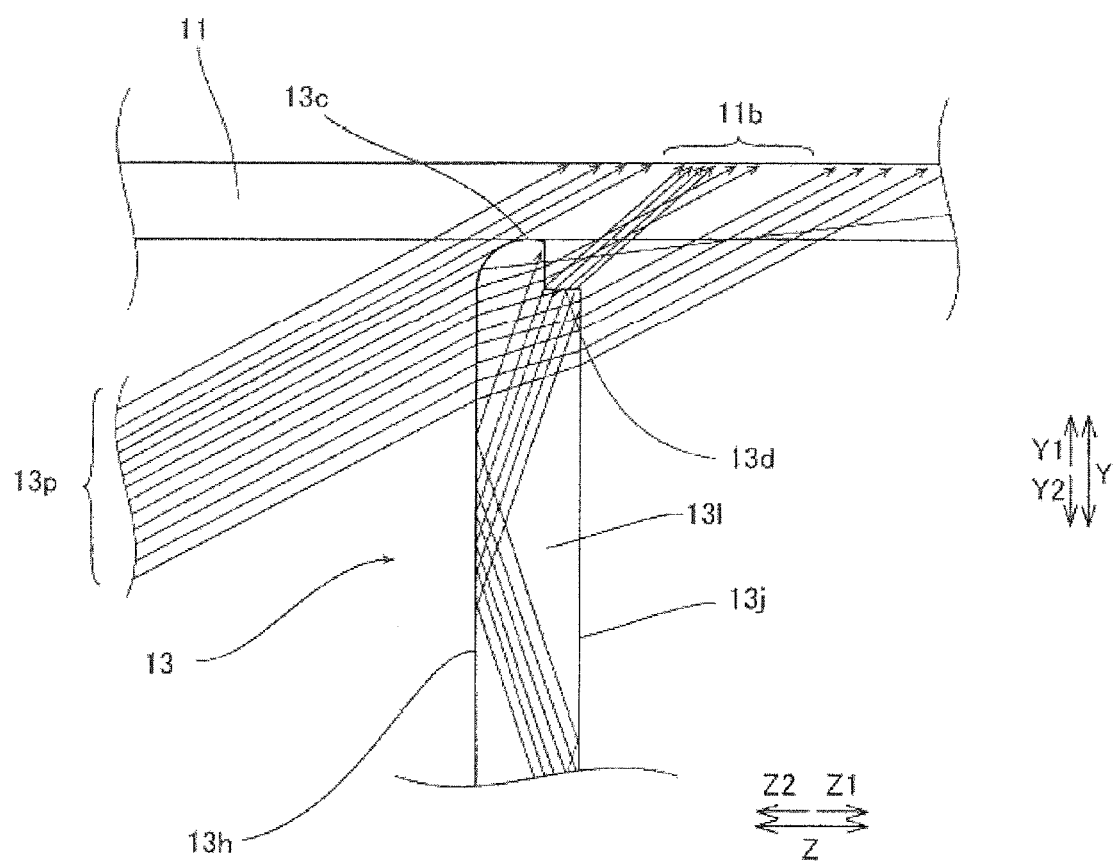
FIG. 12 is a diagram for describing exiting from the panel post according to one or more embodiments of the first example of the present invention.

According to one or more embodiments as illustrated in FIGS. 11 and 12, in one or more embodiments of the first example, the light guide portion 13$l$ guides the light irradiated from the light source 7 that enters the entrance portion 13$k$ via the front side surface portion 13$i$ to a diffuser panel 11 side of the panel post 13. Moreover, the light guide portion 13$l$ is configured to guide so as to make the light that enters from the entrance portion 13$k$ to exit to a region 11$b$ on the diffuser panel 11 where a shadow occurs by light transmitted through the contact portion 13$c$ being refracted. Specifically, according to one or more embodiments as illustrated in FIG. 11, the light guide portion 13$l$ is configured to guide into the panel post 13 by reflecting, with the inclined surface 13$m$ of the entrance portion 13$k$, a portion of light 13$p$ from the light source 7 incident to an inside of the panel post 13 from the front side surface portion 13$i$. Moreover, according to one or more embodiments as illustrated in FIG. 12, the light guide portion 13$l$ further guides the light guided into the panel post 13 to a vicinity of the contact portion 13$c$. Moreover, the light guide portion 13$l$ is of a structure that guides by repeating reflection back and forth between an inner side of the front side surface portion 13$i$ and an inner side of the rear side surface portion 13$j$ so exiting is enabled in a direction of the region 11$b$ on the diffuser panel 11 where the shadow occurs by the light transmitted through the contact portion 13$c$ being refracted.

Figure 9:
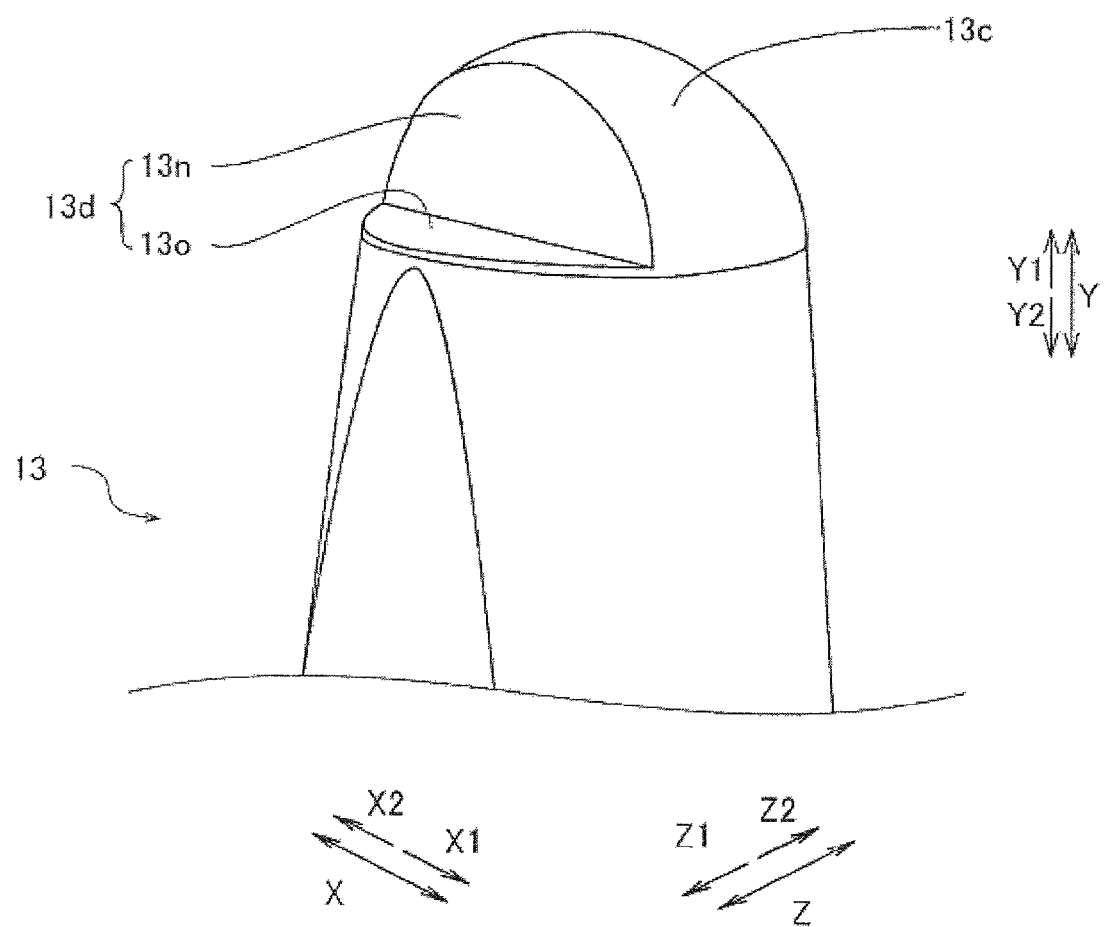
FIG. 9 is an enlarged view of an exit portion of the panel post in FIG. 7.

According to one or more embodiments as illustrated in FIG. 9, in one or more embodiments of the first example, the exit portion 13$d$ is configured to make the light guided by the light guide portion 13$l$ exit from the panel post 13. Moreover, the exit portion 13$d$ is disposed near the contact portion 13$c$ of the panel post 13 and has a surface 13$n$ substantially orthogonal to a top surface of the diffuser panel 11 and a surface 13$o$ substantially parallel to the diffuser panel 11. The exit portion 13$d$ is formed near the contact portion 13$c$ and has a surface 13$n$ formed on an X-Y axis plane and a forming surface 13$o$ on an X-Z axis plane. Moreover, the exit portion 13$d$, according to one or more embodiments as illustrated in FIG. 12, is configured to make the light guided to the vicinity of the contact portion 13$c$ exit to the diffuser panel 11 side.

According to one or more embodiments as illustrated in FIG. 6, the panel post 13 is provided with the fixing portion 13$a$ and the fixing portion 13$b$. The fixing portion 13$a$ and the fixing portion 13$b$ of the panel post 13 are provided in a lower portion of the panel post 13. A pair of hooking portions are provided on the fixing portion 13$a$, which is formed so as to be less likely to be pulled out once fitted into the panel post fixing opening 4$b$. Moreover, the fixing portion 13$b$ prevents the panel post 13 from rotating by being fitted into the panel post fixing opening 4$c$. The panel post 13 is thereby fixed.

Next, a critical angle $\theta 2$, which is a smallest angle at which the light 13$p$ emitted from the light source 7 totally reflects against the inclined surface 13$m$, will be described with reference to FIG. 11.

According to one or more embodiments as illustrated in FIG. 11, an incidence angle of light among the lights 13$p$ emitted from the light source 7 incident from the front side surface portion 13$i$ can be represented by an angle $\theta 1$ formed by a straight line C1 perpendicular to the inclined surface 13$m$ and a traveling direction of the light. A smallest incidence angle at which this light incident from the front side surface portion 13$i$ totally reflects at the inclined surface 13$m$ is represented as an angle formed by the straight line C1 perpendicular to the inclined surface 13$m$ and a traveling direction C3 of the light that totally reflects and is represented as the critical angle $\theta 2$. Moreover, the incidence angle $\theta 1$ is formed to be a larger angle than the critical angle $\theta 2$.

That is, a relationship between θ1 and θ2 is formed so that θ1>θ2. In order to satisfy the relationship above, the inclined surface 13m is formed to form an inclination angle θ3 relative to the front side surface portion 13i.

Next, an operation where the light emitted from the light source 7 enters into the panel post 13 (i.e., through or into an interior of the panel post 13) and is guided will be described with reference to FIGS. 10 to 12.

Figure 10:
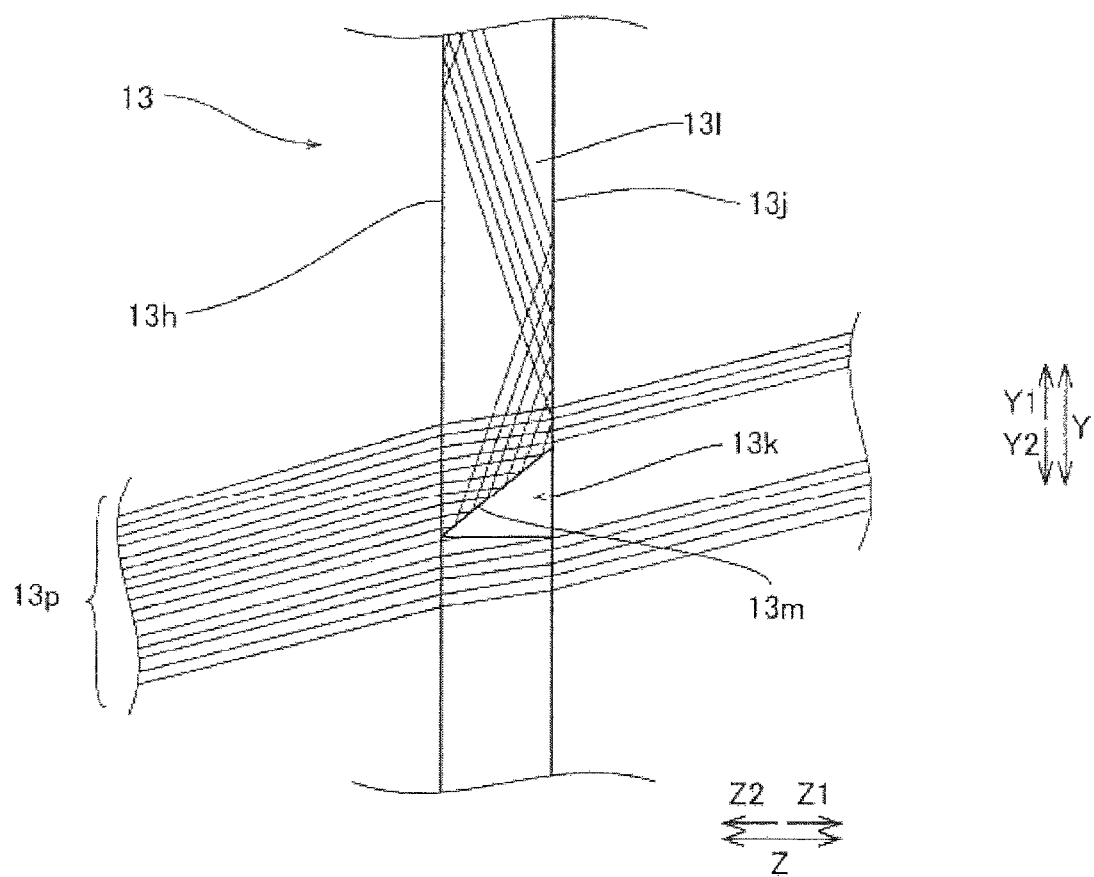
FIG. 10 is a diagram for describing guiding in the panel post according to one or more embodiments of the first example of the present invention.

According to one or more embodiments as illustrated in FIG. 10, the light incident at the incidence angle θ1 from the front side surface portion 13i is totally reflected by the inclined surface 13m and guided to the light guide portion 13l. According to one or more embodiments as illustrated in FIG. 12, the light guided inside the panel post 13 by the light guide 13l is guided to the vicinity of the contact portion 13c and made to exit in a region 11b direction of the diffuser panel 11 by the exit portion 13d. The light guide portion 13l guides the light that enters by being totally reflected by the inclined surface 13m of the entrance portion 13k by being reflected back and forth between the inner side of the rear side surface portion 13j and the inner side of the front side surface portion 13i in a Y1 direction and at a constant reflection angle (an angle formed by straight lines C4 and C5 perpendicular to the totally reflected light and a top surface of the rear side surface portion 13j) θ4. Moreover, the light guided by the light guide portion 13l is guided to the vicinity of the contact portion 13c. The guided light is made to exit from the exit portion 13d provided near the contact portion 13c. The light that exits is irradiated to the region 11b of a shadow that occurs due to an amount of light decreasing by the light 13p from the light source 7 being refracted at the contact portion 13c.

In one or more embodiments of the first example, effects such as below can be obtained.

As described above, one or more embodiments of the first example is provided with the display unit 1, the light source 7 that is disposed on the back surface side of the display unit 1 and irradiates the light to the display unit 1, the optical sheet 12 and the diffuser panel 11 disposed between the display unit 1 and the light source 7, and the panel post 13 that makes the light 13p from the light source 7 be incident to the front side surface portion 13i, is configured to be able to transmit the light incident to the front side surface portion 13i, and supports the optical sheet 12 and the diffuser panel 11 from the back surface side, where the panel post 13 includes the inclined surface 13m that refracts the light incident to the top side side surface portion 13i and the light guide portion 13l that guides the light refracted at the inclined surface 13m to the diffuser panel 11 side of the panel post 13. By this, at least a portion of the light that enters the panel post 13 from the entrance portion 13k can guide the light guided inside the panel post 13 to the diffuser panel 11 side. By this, an amount of light that arrives near the portion of the panel post 13 that supports the diffuser panel 11 can be suppressed from decreasing. As a result, unevenness in an amount of light in the display unit 1 that displays by the light transmitted through the diffuser panel 11 can be suppressed from occurring.

Furthermore, in one or more embodiments of the first example, as described above, a side surface of the panel post 13 includes the front side surface portion 13i to which the light irradiated from the light source 7 is incident and the rear side surface portion 13j on the side opposite the front side surface portion 13i, the entrance portion 13k has the inclined surface 13m provided on the rear side surface portion 13j of the panel post 13, and the inclined surface 13m is disposed at an incline so as to reflect the light that enters the entrance portion 13k to a light guide portion 13l side. By this, because the inclined surface 13m is inclined so as to reflect the light that enters the entrance portion 13k to the light guide portion 13l side, the light incident to the inside of the panel post 13 via the front side surface portion 13i can be reflected to the light guide portion 13l side by the inclined surface 13m and easily guided to the light guide portion 13l.

Furthermore, in one or more embodiments of the first example, the panel post 13 includes the contact portion 13c that contacts the diffuser panel 11, and the light guide portion 13l is configured to guide the light that enters from the entrance portion 13k so as to exit to the region 11b on the diffuser panel 11 where the shadow occurs due to the light transmitted through the contact portion 13c being refracted. By this, because the light guided by the light guide portion 13l is made to exit to the region on the panel post 13 where the shadow occurs, light amount unevenness can be effectively suppressed from occurring on the diffuser panel 11.

Furthermore, in one or more embodiments of the first example, as described above, the entrance portion 13k is provided so the position in the direction parallel to the diffuser panel 11 overlaps the contact portion 13c when viewed from the front side surface portion 13i side, to which the light is incident, of the panel post 13, and the width W2 of the entrance portion 13k is formed to be equal to or greater than the width W1 of the contact portion 13c. By this, more of light incident to the panel post 13 can be made to enter a wide entrance portion 13k and more of the light that enters the entrance portion 13k can be guided to the contact portion 13c by the light guide portion 13l.

Furthermore, in one or more embodiments of the first example, as described above, the panel post 13 includes the exit portion 13d configured to make the light guided by the light guide portion 13l to exit from the panel post 13, and the exit portion 13d is disposed near the contact portion 13c of the panel post 13 and has the surface 13n substantially orthogonal to the top surface of the diffuser panel 11 and the surface 13o substantially parallel to the diffuser panel 11; by this, an exit direction of the guided light can be adjusted by adjusting sizes of the surface 13n substantially orthogonal to the top surface of the diffuser panel 11 and the surface 13o substantially parallel to the diffuser panel 11. As a result, because exiting can be performed more precisely to the region 11b on the diffuser panel 11 where the shadow occurs, the light amount unevenness can be further suppressed from occurring on the diffuser panel 11.

Furthermore, in one or more embodiments of the first example, as described above, the entrance portion 13k is provided in the portion of the panel post 13 below the straight line A connecting the light source 7, which makes the light enter the entrance portion 13k, and the outer edge portion 11a of the diffuser panel 11. By this, because the diffuser panel 11 and the straight line A connecting the light source 7 and the entrance portion 13k do not intersect, a shadow of the entrance portion 13k can be suppressed from occurring on the diffuser panel 11. As a result, the light amount unevenness can further be effectively suppressed from occurring on the diffuser panel 11.

Furthermore, in one or more embodiments of the first example, as described above, the panel post 13 is formed in a tabular shape including the front side surface portion 13i to which the light irradiated from the light source 7 is incident and the rear side surface portion 13j, which is on the side opposite the front side surface portion 13i, provided with the inclined surface 13m of the entrance portion 13k, and the front side surface portion 13i and the rear side surface portion 13j of the panel post 13 are formed to be substantially parallel to each other. By this, the light that enters the panel post 13 can be guided in a diffuser panel 11 direction by being reflected back and forth at a substantially constant reflection angle θ4 between the front side surface portion 13*i* and the rear side surface portion 13*j*. As a result, guiding can be performed easily to the diffuser panel 11 side in the panel post 13.

Furthermore, in one or more embodiments of the first example, as described above, the light source 7 includes the white LED (point light source). By this, the light source 7 can be made smaller in size.

Second Embodiment

Next, a configuration of a panel post 131 according to one or more embodiments of a second example will be described with reference to FIGS. 13 and 14. In one or more embodiments of the second example, unlike the panel post 13 of one or more embodiments of the first example whose exit portion 13*d* and contact portion 13*c* are provided separately, a contact portion 131*a* is configured to also serve as an exit portion.

Figure 13:
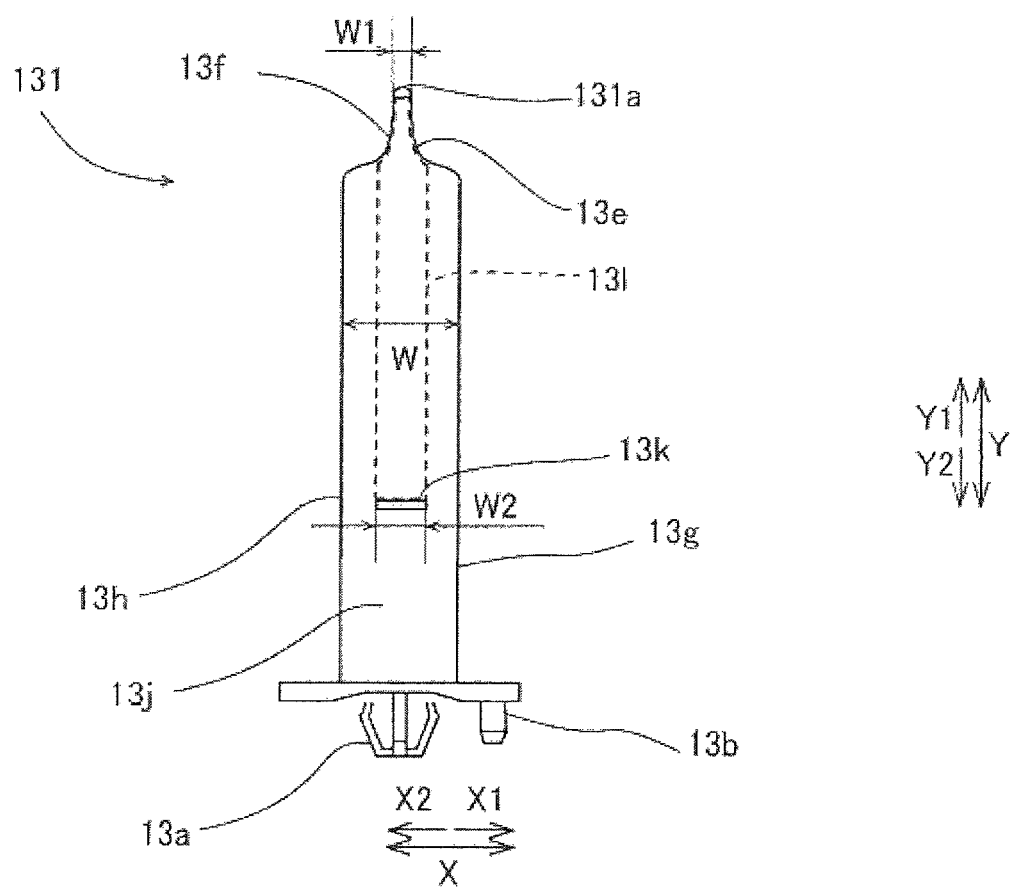
FIG. 13 is a front view of a panel post according to one or more embodiments of a second example of the present invention.
Figure 14:
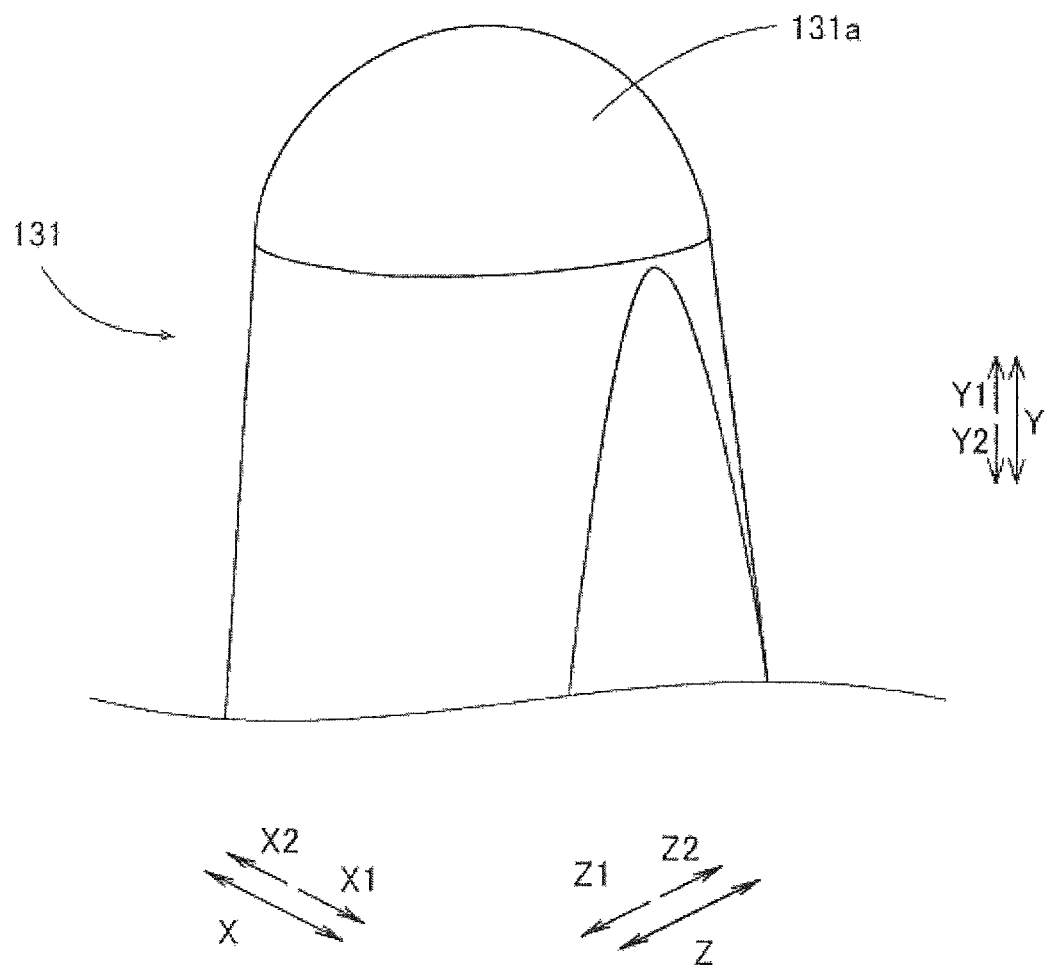
FIG. 14 is a perspective view of an exit portion of the panel post according to one or more embodiments of the second example of the present invention.

According to one or more embodiments as illustrated in FIGS. 13 and 14, in one or more embodiments of the second example, the contact portion 131*a* of the panel post 131 is formed in a substantially spherical shape. Moreover, the contact portion 131*a* has a portion that contacts the diffuser panel 11. Moreover, the contact portion 131*a* is configured to also serve as the exit portion. Moreover, other configurations of the panel post 131 according to one or more embodiments of the second example are similar to those of one or more embodiments of the first example described above.

In one or more embodiments of the second example, effects such as below can be obtained. As described above, the panel post 131 is configured so the contact portion 131*a* also serves as the exit portion. By this, a mechanical strength of the contact portion 131*a* can be increased because a volume of the contact portion 131*a* can be increased compared to when providing the contact portion and the exit portion separately. Moreover, the configuration of the panel post 131 can be simplified by an extent the contact portion 131*a* also serves as the exit portion. Other effects of the panel post 131 according to one or more embodiments of the second example are similar to those of one or more embodiments of the first example described above.

Third Embodiment

Next, a configuration of a panel post 132 according to one or more embodiments of a third example will be described with reference to FIG. 15. In one or more embodiments of the third example, unlike the panel post 13 of one or more embodiments of the first example whose inclined surface 13*m* of the entrance portion 13*k* is configured to have a planar shape, an inclined surface 132*b* of an entrance portion 132*a* is configured to have a curved surface shape.

Figure 15:
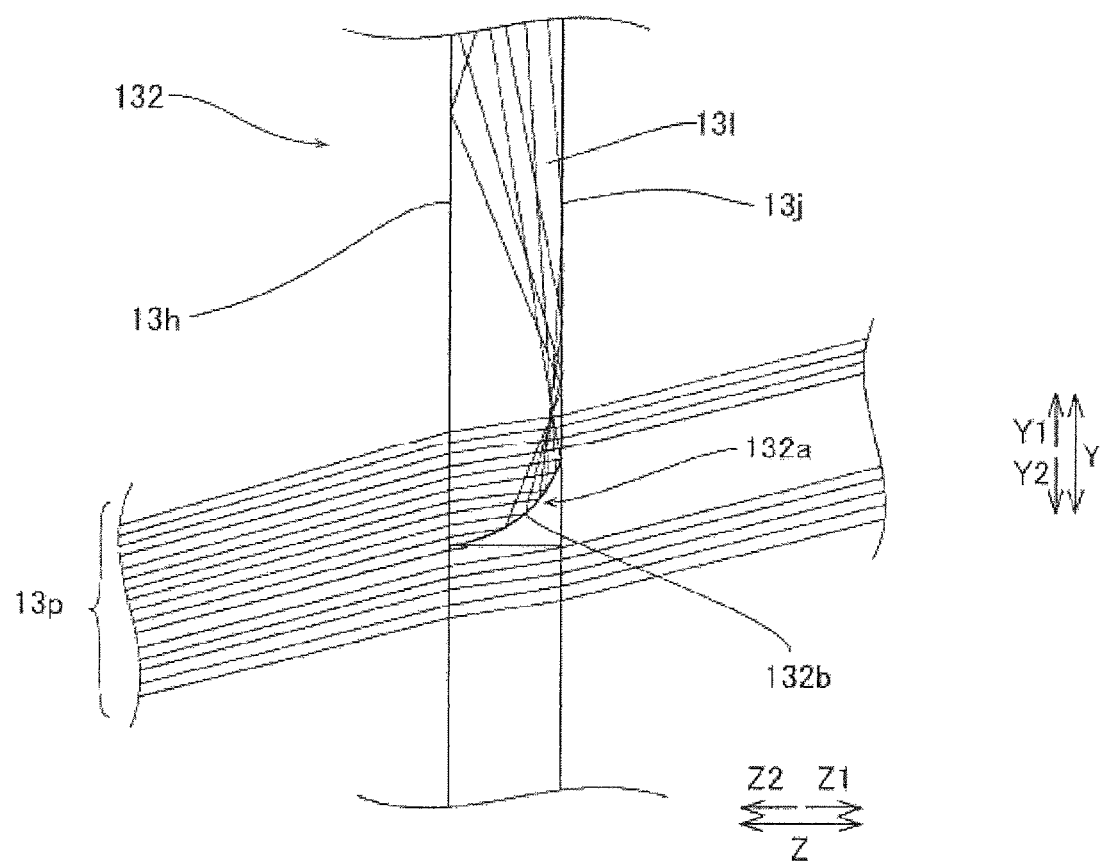
FIG. 15 is a diagram for describing entering into a panel post according to one or more embodiments of a third example of the present invention.

According to one or more embodiments as illustrated in FIG. 15, in one or more embodiments of the third example, the inclined surface 132*b* of the entrance portion 132*a* has the curved surface shape so as to draw a concave surface in the arrow Y2 direction. Moreover, other configurations of the panel post 132 according to one or more embodiments of the third example are similar to those of one or more embodiments of the first example described above.

In one or more embodiments of the third example, effects such as below can be obtained. As described above, the inclined surface 132*b* of the entrance portion 132*a* has the curved surface shape. By this, from among lights 13*p* that are emitted from the light source 7 and are incident to an inside of the panel post 132, light incident to the entrance portion 132*a* from a wider angle can be guided to a light guide portion 132*c*. Moreover, other effects of the panel post 132 according to one or more embodiments of the third example are similar to those of one or more embodiments of the first example described above.

Fourth Embodiment

Next, a configuration of a liquid crystal television device 101 according to one or more embodiments of a fourth example will be described with reference to FIG. 16. In one or more embodiments of the fourth example, unlike the liquid crystal television device 100 according to one or more embodiments of the first example where a position of the entrance portion 13*k* of the panel post 13 is determined by a positional relationship between the light source 7, the panel post 13, and the edge portion 11*a* of the diffuser panel 11, the entrance portion 13*k* of a panel post 133 is determined by a positional relationship between a first light source 7*a*, a second light source 7*b*, and the panel post 13.

Figure 16:
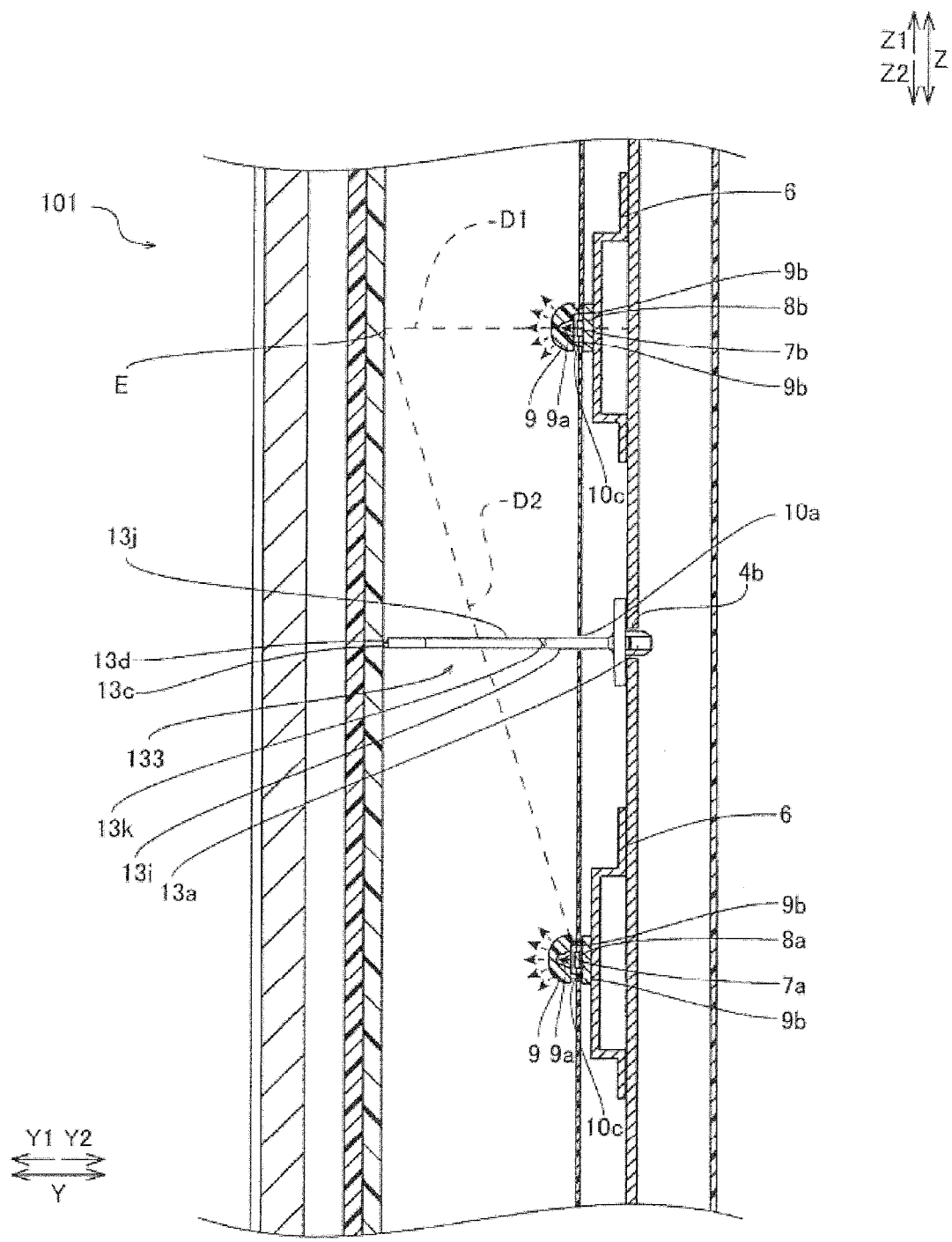
FIG. 16 is a diagram illustrating a portion of a cross section of a liquid crystal television device according to one or more embodiments of a fourth example of the present invention.

According to one or more embodiments as illustrated in FIG. 16, a plurality of light sources (first light source 7*a* and second light source 7*b*) is mounted on two substrates (one substrate 8*a* and another substrate 8*b*) in one column, respectively, along a direction (X-axis direction) in which the one substrate 8*a* extends. Moreover, the panel post 133 is disposed on the rear frame 4 in a position substantially midway between the first light source 7*a* and the second light source 7*b*. Moreover, the front side surface portion 13*i* is disposed so as to oppose the first light source 7*a* disposed on the one substrate 8*a*. Moreover, the rear side surface portion 13*j* is disposed so as to oppose the second light source 7*b* disposed on the other substrate 8*b*. Here, in one or more embodiments of the fourth example, the light source 7 includes the first light source 7*a* and the second light source 7*b* disposed respectively in a front side surface portion 13*i* direction (arrow Z2 direction) in which the light irradiated from the light source 7 of the panel post 133 is incident and a rear side surface portion 13*j* direction (arrow Z1 direction) on a side opposite the front side surface 13*i*. Moreover, the entrance portion 13*k* is provided in a portion of the panel post 133 below a straight line D2 connecting an intersection E between a perpendicular line D1, which extends from the second light source 7*b* to a diffuser panel 11 side (arrow Y1 direction), and the diffuser panel 11, and the first light source 7*a*. Moreover, other configurations of the liquid crystal television device 101 according to one or more embodiments of the fourth example are similar to those of one or more embodiments of the first example described above.

In one or more embodiments of the fourth example, effects such as below can be obtained. As described above, the entrance portion 13*k* is provided in the portion of the panel post 133 below the straight line D2 connecting the intersection E between the perpendicular line D1, which extends from the second light source 7*b* to the diffuser panel 11 side (arrow Y1 direction), and the diffuser panel 11, and the first light source 7*a*. By this, while a shadow due to the entrance portion 13*k* occurs on the top surface of the diffuser panel 11, an influence of this shadow can be mitigated by light from the second light source 7*b*. As a result, the light amount unevenness can further be effectively suppressed from occurring on the diffuser panel 11.

Fifth Embodiment

Next, a configuration of a panel post 134 according to one or more embodiments of a fifth example will be described. In one or more embodiments of the fifth example, effects such as below can be obtained. Unlike the panel post 13 of one or more embodiments of the first example, an entrance portion 134a in a panel post 134 includes a reflective material that can reflect the light irradiated from the light source 7. By this, the light irradiated from the light source 7 that enters the entrance portion 134a can be easily reflected to the light guide portion 13l. Moreover, other configurations and effects of the panel post 134 according to one or more embodiments of the fifth example are similar to those of one or more embodiments of the first example described above.

The embodiments herein disclosed are examples on all points and should not be considered to be limiting. The scope of the present invention is indicated not by the above description of the embodiments but by the scope of patent claims and includes meanings equivalent to the scope of patent claims and all modifications within the scope.

For example, in the first to fifth examples described above, a television device is used as the display device, but the present invention is not limited thereto. One or more embodiments of the present invention may be used in a display device other than the television device. For example, it may be used in a general display device, such as a display device for a personal computer (PC).

Furthermore, in the first to fifth examples described above, a diffuser panel made of resin is used as an optical member of a plate shape, but the present invention is not limited thereto. In one or more embodiments of the present invention, an optical member of a plate shape other than the diffuser panel made of resin may be used.

Furthermore, in the first to fifth examples described above, one or two substrates mounted with a plurality of light sources on one straight line, but the present invention is not limited thereto. In one or more embodiments of the present invention, three or more substrates mounted with the plurality of light sources on the one straight line may be provided.

Furthermore, in the first to fifth examples described above, six panel posts are disposed, but the present invention is not limited thereto. In one or more embodiments of the present invention, seven or more or less than six panel posts may be disposed.

Furthermore, in the first to fifth examples described above, a panel post is formed in a tabular shape, but the present invention is not limited thereto. In one or more embodiments of the present invention, the panel post does not have to be formed in the tabular shape. For example, according to one or more embodiments as illustrated in FIG. 17, according to one or more embodiments as illustrated in a first modified example, the panel post may be formed in a conical shape.

Figure 17:
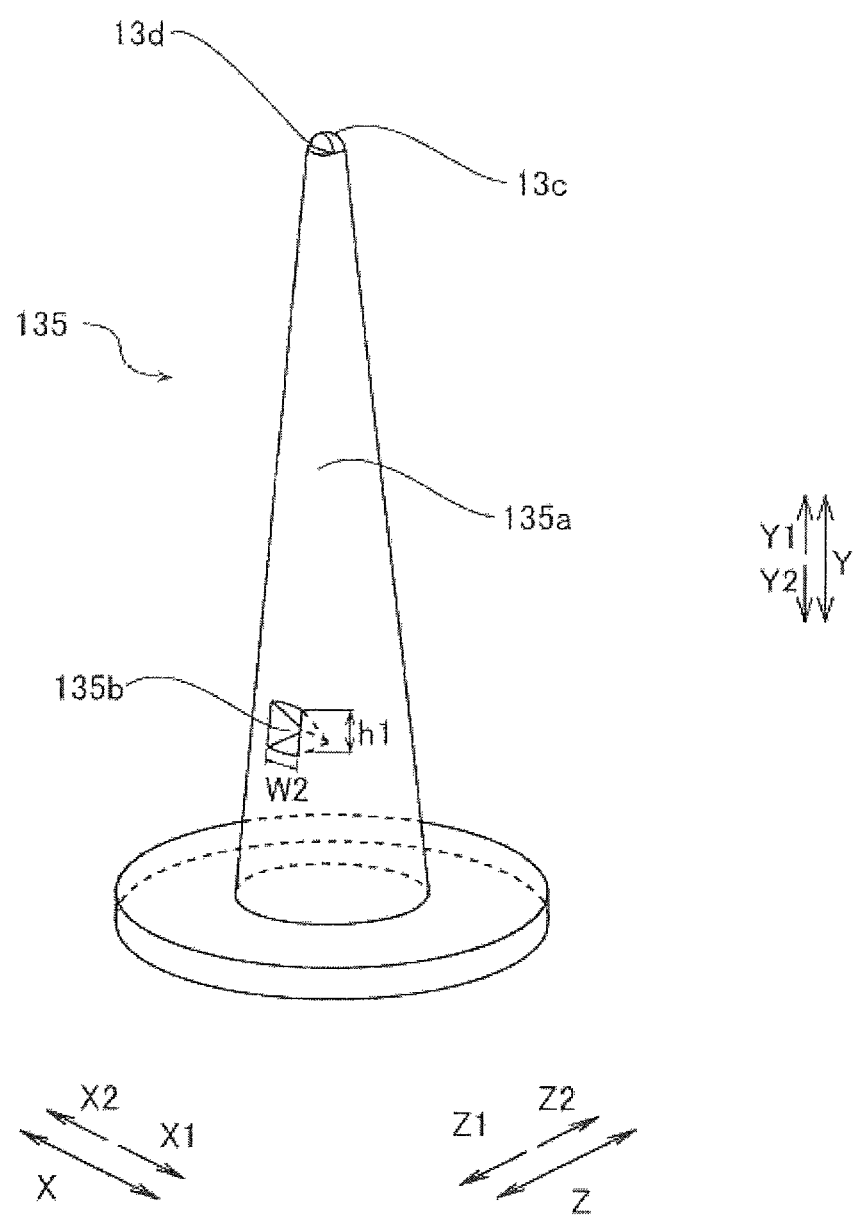
FIG. 17 is a perspective view of a panel post according to a first modified example of one or more embodiments of the first example of the present invention.

Here, in the first modified example, according to one or more embodiments as illustrated in FIG. 17, a panel post 135 has a conical shape due to a side surface 135a extending from the contact portion 13c to the fixing portions 13a and 13b. Moreover, an entrance portion 135b is formed with the width W2 and a height h1. Moreover, the entrance portion 135b is provided on a side opposite the light source 7 (arrow Z1 direction side).

Figure 18:
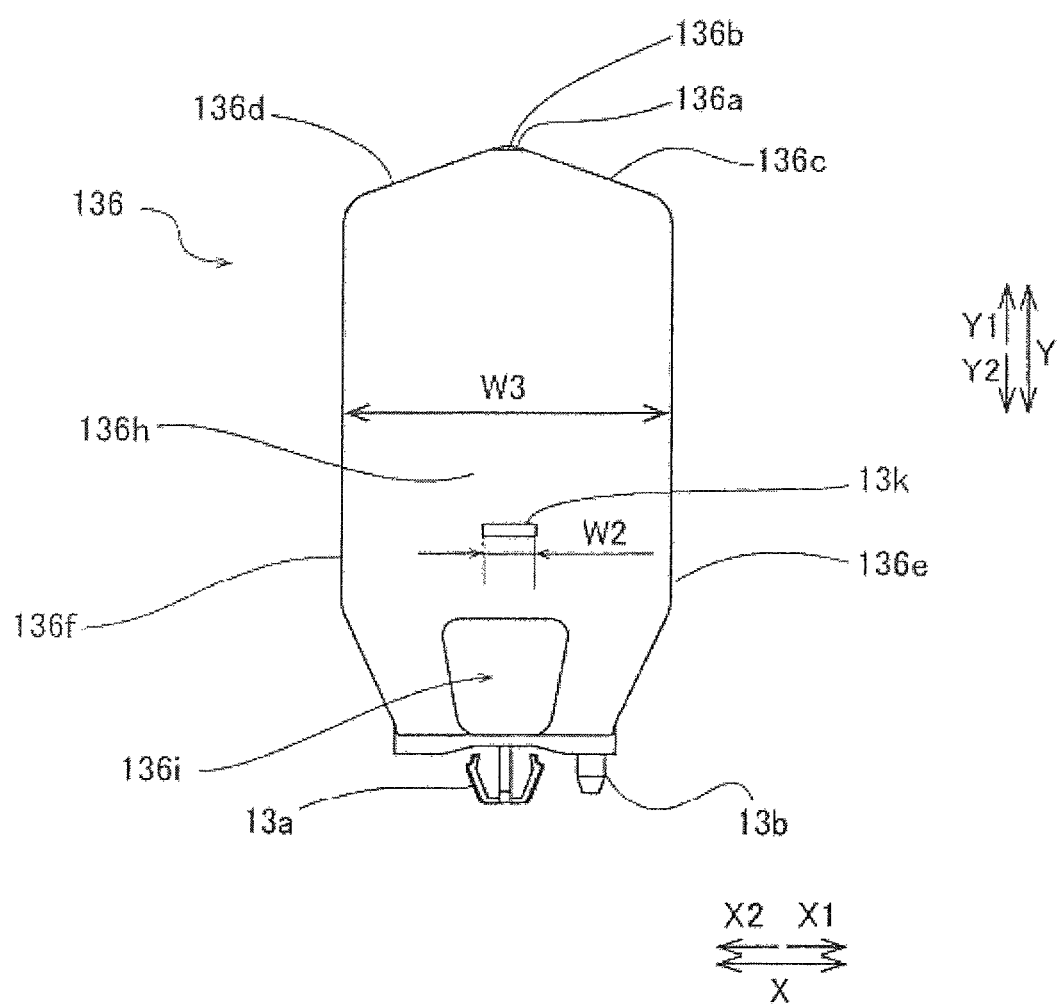
FIG. 18 is a front view of a panel post according to a second modified example of one or more embodiments of the first example of the present invention.
Figure 19:
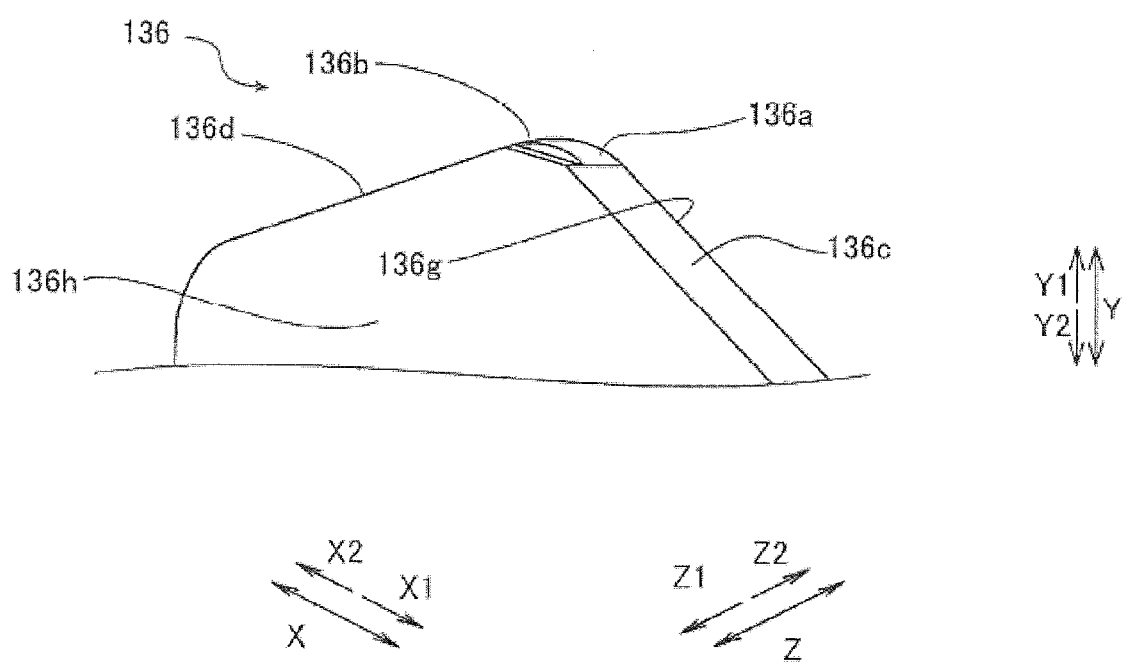
FIG. 19 is a perspective view of a vicinity of a contact portion of the panel post according to the second modified example of one or more embodiments of the first example of the present invention.

Furthermore, in a second modified example, according to one or more embodiments as illustrated in FIGS. 18 and 19, a panel post 136 is provided with a contact portion 136a that is a portion that contacts the diffuser panel 11. Moreover, an exit portion 136b having a surface (X-Y axis plane) in a direction orthogonal to the top surface of the diffuser panel 11 and a surface (X-Z axis plane) parallel to the diffuser panel 11 is disposed near the contact portion 136a. Moreover, two upper sides 136c and 136d extending to the outer sides from the contact portion 136a and two lateral sides 136e and 136f extending in a direction opposite the diffuser panel 11 from the upper sides 136c and 136d are had. The contact portion 136a is formed in a curved surface shape and makes line contact with the diffuser panel 11. Moreover, the lateral side 136e has a straight line shape extending in a direction perpendicular to the diffuser panel 11 from the upper side 136c and a straight line shape extending at an incline toward a center of the panel post 136 from a lower edge of the straight line shape. Similarly, the lateral side 136f has a straight line shape extending in a direction perpendicular to the diffuser panel 11 from the upper side 136d and a straight line shape extending at an incline toward the center of the panel post 136 from a lower edge of the straight line shape. Moreover, a front side surface portion 136g and a rear side surface portion 136h where a width between the lateral side 136d and the lateral side 136f is W3 are had. Moreover, the panel post 136 is provided with an opening portion 136i of a trapezoidal shape with rounded corners whose length of a side on an upper side is longer than a length of a side on a lower side.

Furthermore, in the first to fifth examples described above, a contact portion of the panel post is formed in a spherical shape, but the present invention is not limited thereto. In one or more embodiments of the present invention, the contact portion of the panel post does not have to be formed in the spherical shape. For example, according to one or more embodiments as illustrated in the second modified example, the contact portion of the panel post may be formed in a curved surface shape and configured to make line contact with the diffuser panel.

Furthermore, in the first to fifth examples described above, an opening portion is not provided in the panel post, but the present invention is not limited thereto. In one or more embodiments of the present invention, the opening portion may be formed in a region of the panel post that is more toward a rear frame side than the reflective sheet and where the light irradiated from the light source is transmitted through an interior of the panel post and does not hit the diffuser panel. For example, in the second modified example, the opening portion of the trapezoidal shape with rounded corners is formed.

Furthermore, in the first to fifth examples described above, a shape of an entrance portion of the panel post is formed in a square shape when viewed from the arrow Z2 direction, but the present invention is not limited thereto. In one or more embodiments of the present invention, the shape of the entrance portion does not have to be formed in the square shape when viewed from the arrow Z2 direction. For example, it may be in a triangular shape or a round shape when viewed from the arrow Z1 direction.

Furthermore, in the first to fifth examples described above, the entrance portion of the panel post is provided so a position in a direction parallel to the diffuser panel 11 overlaps the contact portion, but the present invention is not limited thereto. In one or more embodiments of the present invention, a portion of the position in the direction parallel to the diffuser panel 11 may be disposed shifted from the contact portion.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

EXPLANATION OF REFERENCE CODES

1 Display unit
7 Light source
7a First light source
7b Second light source
11 Diffuser panel (optical member)
11a Outer edge portion
11b Region
12 Optical sheet (optical member)
13, 131, 132, 133, 134, 135, 136 Panel post (support member)
13c, 131a, 136a Contact portion
13d, 136b Exit portion
13i, 136g Front side surface portion (side surface, rear side surface)
13j, 136h Rear side surface portion (side surface, rear side surface)
13k, 132a, 134a, 135b Entrance portion
13l Light guide portion
13m, 132b Inclined surface
13n Surface (surface substantially orthogonal to top surface of optical member)
13o Surface (surface substantially parallel to optical member)
13p Light (light from light source)
100, 101 Liquid crystal television device (display device)
135a Side surface
A, C2 Straight line
C1 Perpendicular line
D Intersection

What is claimed is:

1. A display device, comprising:
   a display;
   a light source disposed on a back surface side of the display and that irradiates light to the display;
   an optical member disposed between the display and the light source; and
   a support member comprising:
     a first surface having a predetermined area;
     a second surface that is a back surface of the first surface;
     a third surface adjacent to the first surface and having an area that is smaller than the predetermined area;
     an entrance portion formed in a concave shape in only one of either the first surface or the second surface and comprising an inclined surface inclined with respect to the first surface; and
     a light guide portion that guides the light refracted at the inclined surface to an optical member side of the support member, wherein
   the support member supports the optical member from a back surface side of the optical member.

2. The display device according to claim 1, wherein the support member comprises a contact portion that contacts the optical member, and the light guide portion guides the light that enters from the entrance portion to exit to a region on the optical member where a shadow occurs due to light transmitted through the contact portion being refracted.

3. The display device according to claim 2, wherein a position of the entrance portion in a direction parallel to the optical member overlaps the contact portion when viewed from a side surface side of the support member to which light is incident, and a width of the entrance portion is equal to or greater than a width of the contact portion.

4. The display device according to claim 1, wherein the support member comprises:
   a contact portion that contacts the optical member; and
   an exit portion where the light guided by the light guide portion exits the support member, and
   the exit portion is disposed near the contact portion of the support member and comprises a surface substantially orthogonal to a top surface of the optical member and a surface substantially parallel to the optical member.

5. The display device according to claim 1, wherein the entrance portion is disposed on the support member below a straight line connecting the light source and an outer edge portion of the optical member.

6. The display device according to claim 1, wherein
   the light source comprises a first light source and a second light source disposed respectively in a first surface direction of the support member in which the light irradiated from the light source is incident and a second surface direction on the side opposite the first surface, and
   the entrance portion is disposed on the support member below a straight line connecting the first light source and an intersection of the optical member and a perpendicular line extending from the second light source on an optical member side.

7. The display device according to claim 1, wherein the support member is formed in a tabular shape.

8. The display device according to claim 1, wherein the light source comprises a point light source.

9. The display device according to claim 1, wherein the support member comprises:
   a contact portion that contacts the optical member; and
   an exit portion where the light guided by the light guide portion exits the support member, and
   the exit portion is disposed near the contact portion of the support member and comprises a surface substantially orthogonal to a top surface of the optical member and a surface substantially parallel to the optical member.

10. The display device according to claim 1, wherein the entrance portion is disposed on the support member below a straight line connecting the light source and an outer edge portion of the optical member.

11. A display device, comprising:
    a display;
    a light source disposed on a back surface side of the display and that irradiates light to the display;
    an optical member disposed between the display and the light source; and
    a support member comprising:
      a first surface having a predetermined width in a direction parallel to a display surface of the display;
      a second surface parallel to the first surface;
      a third surface adjacent to the first surface and having a width in the direction that is shorter than the predetermined width;

an entrance portion formed in a concave shape in only one of either the first surface or the second surface and comprising an inclined surface inclined with respect to the first surface; and a light guide portion that guides the light refracted at the inclined surface to an optical member side of the support member, wherein the support member supports the optical member from a back surface side of the optical member.

12. The display device according to claim 11, wherein the support member comprises a contact portion that contacts the optical member, and the light guide portion guides the light that enters from the entrance portion to exit to a region on the optical member where a shadow occurs due to light transmitted through the contact portion being refracted.

13. The display device according to claim 12, wherein a position of the entrance portion in a direction parallel to the optical member overlaps the contact portion when viewed from a side surface side of the support member to which light is incident, and a width of the entrance portion is equal to or greater than a width of the contact portion.

14. The display device according to claim 11, wherein the support member comprises:

a contact portion that contacts the optical member; and an exit portion where the light guided by the light guide portion exits the support member, and the exit portion is disposed near the contact portion of the support member and comprises a surface substantially orthogonal to a top surface of the optical member and a surface substantially parallel to the optical member.

15. The display device according to claim 11, wherein the entrance portion is disposed on the support member below a straight line connecting the light source and an outer edge portion of the optical member.

16. The display device according to claim 11, wherein the light source comprises a first light source and a second light source disposed respectively in a first surface direction of the support member in which the light irradiated from the light source is incident and a second surface direction on the side opposite the first surface, and the entrance portion is disposed on the support member below a straight line connecting the first light source and an intersection of the optical member and a perpendicular line extending from the second light source on an optical member side.

17. The display device according to claim 11, wherein the entrance portion comprises reflective material that can reflect the light irradiated from the light source.

18. The display device according to claim 11, wherein the light source comprises a point light source.

19. The display device according to claim 11, wherein the support member comprises:

a contact portion that contacts the optical member; and an exit portion where the light guided by the light guide portion exits the support member, and the exit portion is disposed near the contact portion of the support member and comprises a surface substantially orthogonal to a top surface of the optical member and a surface substantially parallel to the optical member.

20. The display device according to claim 11, wherein the entrance portion is disposed on the support member below a straight line connecting the light source and an outer edge portion of the optical member.

* * * * *